United States Patent [19]
Jang

[11] Patent Number: 5,864,474
[45] Date of Patent: Jan. 26, 1999

[54] APPARATUS FOR CONTROLLING RESCUE OPERATIONS AND FOR IMPROVING POWER EFFICIENCY

[75] Inventor: Cheol Ho Jang, Kyoungsangnam-Do, Rep. of Korea

[73] Assignee: LG Industrial Systems Co., Ltd., Seoul, Rep. of Korea

[21] Appl. No.: 57,459

[22] Filed: Apr. 9, 1998

[30] Foreign Application Priority Data

Apr. 10, 1997 [KR] Rep. of Korea ........................ 97-13169

[51] Int. Cl.⁶ ................................ H02M 1/12; H02J 9/04
[52] U.S. Cl. ................................ 363/39; 307/64; 187/296
[58] Field of Search .................................. 363/37, 39, 40, 363/50, 55, 56; 307/64, 65, 66; 187/290, 296, 297

[56] References Cited

U.S. PATENT DOCUMENTS

| | | | |
|---|---|---|---|
| 4,445,467 | 5/1984 | Okado | 363/56 |
| 4,642,474 | 2/1987 | Watanbe | 307/64 |
| 4,678,063 | 7/1987 | Kitaoka et al. | 187/296 |
| 5,285,029 | 2/1994 | Araki | 187/290 |

*Primary Examiner*—Peter S. Wong
*Assistant Examiner*—Y. J. Han

[57] ABSTRACT

An apparatus for controlling rescue operations and for improving power efficiency in which an Auto Landing of Power failure ALP device is provided with an active power filter for supplying a compensation current to a control unit when the ALP device is in a stand by condition that a power failure does not occur. The apparatus includes a control unit for controlling an operation of an elevator cage by activating an induction motor with a three-phase AC voltage source; an ALP device for controlling an emergency mode by supplying the three-phase AC voltage converted from a DC voltage from a battery by a stand-by inverter when a power failure occurs, opening/closing contacts being opened in a normal power supply condition so as to make the ALP device not connected to the control unit and being closed in a power failure condition so as to make the ALP device connected to the control unit for supplying the power; a DC voltage detector for detecting the DC voltage supplied to the stand-by inverter; a real current detector for detecting the current supplied to the control unit in the normal power supply condition; a power source voltage detector for detecting a voltage of the power source supplied to the control unit; and an automatic rescue operation controller for controlling the ALP device to perform an automatic rescue operation in the power failure condition, and for acting as an active power compensation filter in the normal power supply condition.

3 Claims, 6 Drawing Sheets

FIG. 6B

APPARATUS FOR CONTROLLING RESCUE OPERATIONS AND FOR IMPROVING POWER EFFICIENCY

BACKGROUND OF THE INVENTION

1. Field of the Invention

The present invention relates to a rescue device whose power efficiency is improved with the use of an Auto Landing of Power failure device (Hereinafter, referred to as an ALP device), and in particular to an ALP device capable of providing a function of an active filter during a normal power supply with the power efficiency of a control panel improved, while still providing its own function when a power failure occurs.

2. Description of the Related Art

In general, an elevator system includes an ALP device to accomplish a rescue operation so as to rescue a plurality of passengers locked in an elevator car which is abruptly stopped due to a power failure.

When a power failure occurs, the ALP device supplies its battery voltage to the control panel after adjustment of its battery voltage to a predetermined level which is appropriate to an input terminal of the control panel. However, the ALP device is not operating unless the power source fails or is malfunctioning.

Figure 1:
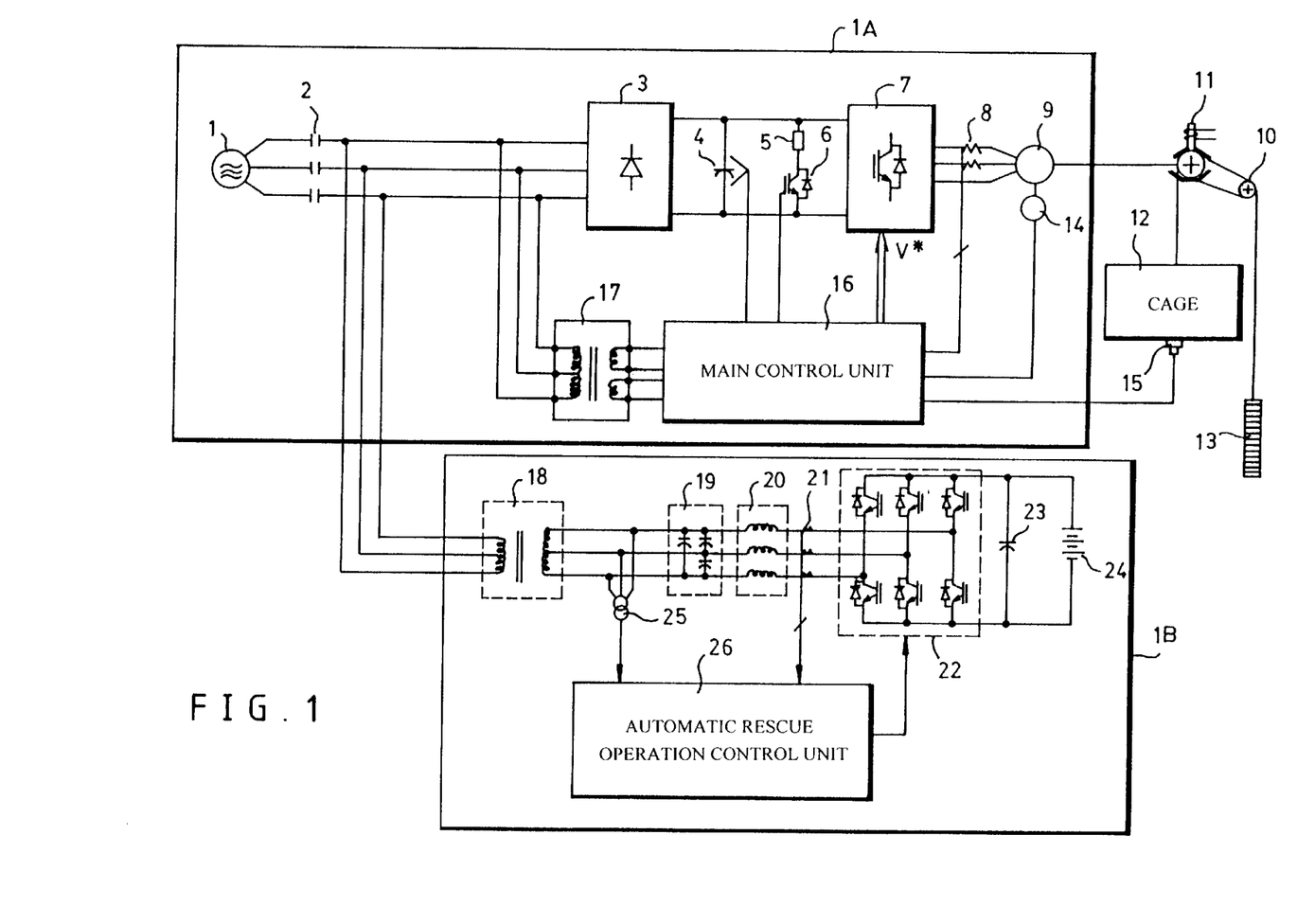
FIG. 1 is a block diagram of the conventional rescue device in an elevator system.

FIG. 1 shows the construction of a control panel 1A and the ALP device 1B which are included in a rescue device. Referring to FIG. 1, the control panel 1A comprises an AC/DC converter 3 for converting an AC power transmitted from a three-phase AC voltage source 1 via contacts 2 which is closed when the power is supplied to elevator devices; a capacitor 4 acting as a smoothing circuit for decreasing the ripple of the DC power outputted from the AC/DC converter 3; an inverter 7 for converting the DC voltage across the capacitor to the three-phase AC voltage with a variable voltage VV and a variable frequency VF; a current ampere meter 8 for reading the output current of the inverter; an induction motor 9 for supplying the power to an elevator cage 12; a speed meter 14 for reading the angular speed of the rotating induction motor; a load detector 15 for detecting the load of the elevator car 12; a central processing unit (hereinafter, referred to as a CPU) 16 for controlling the operation of the inverter 7 so as to make the induction motor to rotate at a target speed upon receipt of output signals of the ampere meter 8, the speed meter 14, and the load detector 15, and for controlling the operation of an element 6 to be conducted resulting in that the power generated from the induction motor when the induction motor starts to rotate in regenerative power domain can be consumed by passing through the resistor 5; and a voltage transformer 17 for supplying an appropriate voltage to the CPU with its fixed turn ratio.

The ALP device 1B comprises a battery 24 for supplying a stand-by DC power of a predetermined level to the system; a capacitor 23 for smoothing the ripples of the DC voltage outputted from the battery; a stand-by inverter 22 for converting the DC voltage across the capacitor to the three-phase AC voltage with the variable voltage VV, and variable frequency VF; an ampere meter 21 for reading the output current of the stand-by inverter; a reactor 20 for smoothing the output current provided to the transformer 18 from the stand-by inverter; a filter 19 for filtering the output voltage provided to the control panel 1A from the inverter 22 across the reactor; a voltage transformer 18 for transforming the output voltage of the inverter 22 to an appropriate level for the CPU 1A; an AC voltmeter 25 for reading the AC voltage from the filter; an automatic rescue mode controller 26 for controlling to activate the stand-by inverter 22 upon receipt of the output signals of the ampere meter 21 and the AC voltmeter 25. Here, the reference numerals 10, 11, and 13 respectively denote a traction machine, a brake, and a counterweight.

Figure 2A:
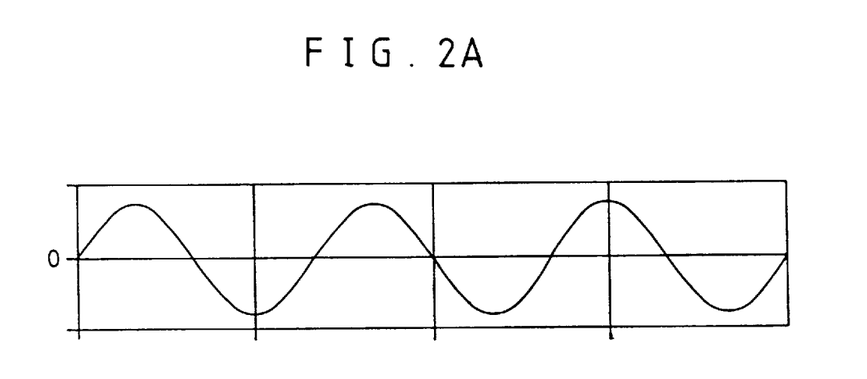
FIGS. 2A, 2B are graphs illustrating the waveforms of the input voltage and the input current at the power input port of a control panel of FIG. 1.

The operation of the rescue device as constructed above will be described with reference to FIGS. 1 and 2. When the three-phase AC voltage source is normally supplying the power, the contacts 2 is in an ON-state so that the voltage of the three-phase AC voltage of a predetermined level is supplied through contact 2 and the voltage transformer to the CPU 16. The voltage of the three-phase voltage is also supplied through the converter 3 and the capacitor 4 to the inverter 7.

The inverter 7 then controls the torque and the rotation number of the induction motor 9 by outputting the three-phase AC power to the induction motor in accordance with an AC voltage signal inputted from the CPU.

The CPU 16 also determines whether or not the regenerative power is generated from the induction motor. If determined that the regenerative power is generated, the CPU outputs a control signal to the element 6 such that the element is conducting, causing the regenerative power to be transmitted through the element and then to be consumed through a resistor 5.

However, if the three-phase AC voltage, namely the normal power source is failed or malfunctioning, the contacts is in an OFF-state. At this time, the DC voltage from the battery 24 is transmitted to the stand-by inverter 22. The stand-by inverter 22 converts the DC voltage across the capacitor 23 to the three-phase AC voltage with the variable voltage and variable frequency upon receipt of the signal from the CPU. The reactor 20 smooths the ripple of the output voltage of the stand-by inverter and transmits the smoothed voltage to the filter. The filter 19 filters the input voltage, and transmits the filtered voltage to the voltage transformer 18. The voltage transformer 18 transforms the input voltage to a predetermined level. On the other hand, the AC voltmeter 25 reads the voltage from the filter, and transmits it to the rescue mode controller 26. The transformer 18 provides its output voltage to the converter 3 disposed in the control panel 1A.

The CPU 16 therefore is operable at the same condition even when the power failure occurs. However, the CPU recognizes that the power is supplied not from the inverter 7 but from the stand-by inverter 22, so that the CPU sets the system with the rescue mode and is operating accordingly to rescue the passengers locked in the elevator car.

The CPU also sends the control signal to make the element 6 conducting so that the regenerative power generated from the induction motor 9 can be consumed and eliminated by passing through the conducting element 6 and then the resistor 5.

Figure 2B:
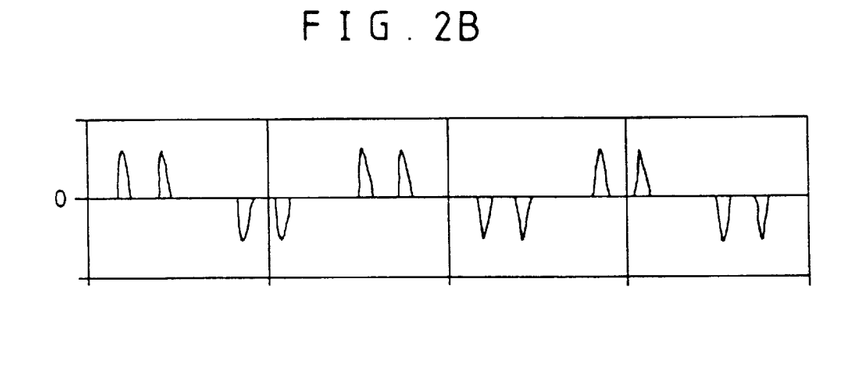

However, when the induction motor 9 is activated by the converter 3 and the inverter 7 to shift the elevator car 12 to the destination floor landing in response to a car call signal or a hall call signal generated by the passenger(s), the current of the converter 3 will be a pulse type as shown in the FIG. 2b.

When the current pulse reversely passes to the three-phase AC voltage 1, the total power efficiency cos φ can be expressed with the power efficiency of the fundamental wave cos $\phi_1$ and the distortion ratio $\mu$ as in the following equations 1 and 2.

$$\cos\phi = \frac{1}{\sqrt{\mu^2 + 1}} \cos\phi_1 \quad \text{(equation 1)}$$

$$\mu = \frac{\text{the total effective value of harmonic wave}}{\text{the effective value of fundamental wave}} \quad \text{(equation 2)}$$

(Here, $\phi$ and $\phi_1$ are phase differences between the current and the voltage of the fundamental wave and the total wave including the fundamental wave and the harmonic wave.)

As can be seen in the equations 1 and 2, the total power efficiency becomes degraded (normally in the range of 0.6~0.75) when the distortion ratio of the current is getting worse. Accordingly, the conventional rescue device suffers from the disadvantages in that the power consumption and the complexity of the input terminal of the control panel are getting increased, and a serious harmonic wave distortion appears at the input terminal.

The conventional rescue device also suffers from a further disadvantage that the ALP device becomes operable only when the power failure occurs, so that the efficiency of the ALP device is low compared to its price.

SUMMARY OF THE INVENTION

The present invention has been made to overcome the above described disadvantages of the related art.

Accordingly, an object of the present invention is to provide a rescue operation control apparatus which can improve the power efficiency of the input terminal of the control panel by providing an additional function of an active power filter to the ALP device so that the ALP device can supply a compensation sinusoidal current at the input terminal of the control panel when a stand-by power is not supplied to the control panel during a normal power supply.

To achieve the above object, there is provided an apparatus for controlling a rescue operation with an improved power efficiency having a control unit for controlling an operation of an elevator cage by activating an induction motor with a three-phase AC voltage source and an ALP device for controlling an emergency mode by supplying the three-phase AC voltage converted from a DC voltage from a battery by means of a stand-by inverter when a power failure occurs, the apparatus comprising opening/closing contacts which are opened (OFF) in a normal power supply condition so as to make the ALP device not connected to the control unit and closed (ON) in a power failure condition so as to make the ALP device connected to the control unit for supplying the power, a DC voltage detector for detecting the DC voltage supplied to the stand-by inverter, a real current detector for detecting the current supplied to the control unit in the normal power supply condition, a power source voltage detector 30 for detecting a voltage of the power source supplied to the control unit, and an automatic rescue operation controller for controlling the ALP device to perform an automatic rescue operation in the power failure condition determined in accordance with output signal of the DC voltage detector, and for acting as an active power compensation filter in the normal power supply condition determined in accordance with output signals of the load current detector, the DC voltage detector, and the power source voltage detector.

BRIEF DESCRIPTION OF THE DRAWINGS

The above object and other advantages of the present invention will become more apparent by describing in detail the preferred embodiment thereof with reference to the attached drawings, in which.

DETAILED DESCRIPTION OF THE PREFERRED EMBODIMENT

A preferred embodiment of the present invention will now be described in detail with reference to the accompanying drawings.

Figure 3:
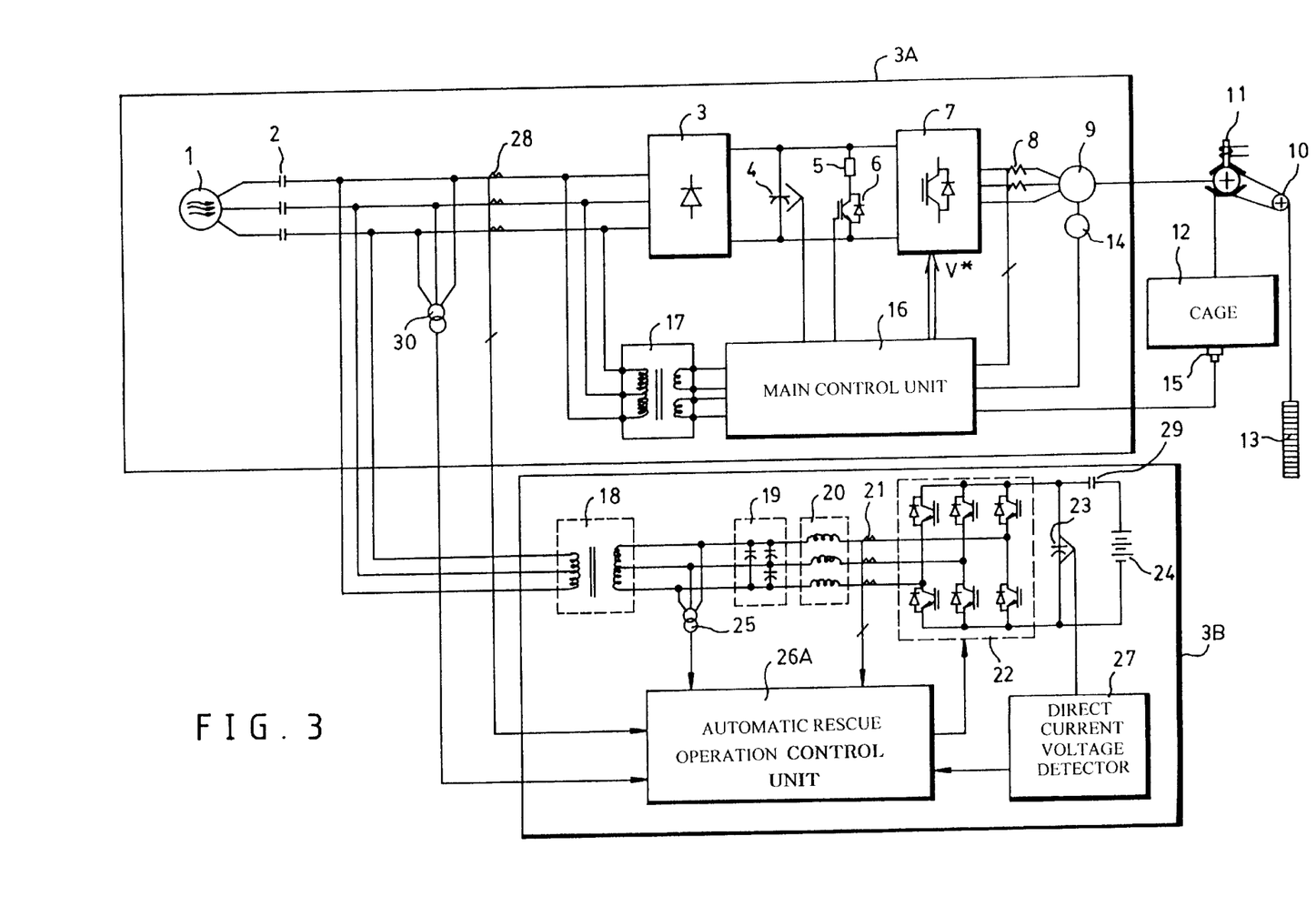
FIG. 3 is a block diagram of the apparatus for controlling rescue operations and for improving power efficiency according to the present invention.

FIG. 3 is a block diagram of the apparatus for controlling a rescue operation and for improving power efficiency according to the present invention. Referring to FIG. 3, the apparatus for controlling an emergency mode and for improving the power efficiency according to the present invention includes a control unit 3A for controlling the operation of elevator by activating an induction motor 9, whose power source for input stage is a three-phase AC voltage source 1, and an ALP device 3B for supplying the power to the power source input stage of the control unit 3A after a DC voltage from a battery 24 is converted to a three-phase AC voltage by a stand-by inverter 22 when a power failure occurs, and for performing a compensation function so as to control the current through the power source input stage of the elevator system to be in the form of a sinusoidal wave in a normal power supply condition. Here, the ALP device 3B comprises a battery 24 for supplying a stand-by power of a certain level, normally opened contacts 29 being opened (OFF) in the normal power supply condition, and being closed (ON) either in a power failure condition or in a mode in which the ALP device 3B operates as an active filter for filtering the power, a capacitor 23 for smoothing the ripple contained in the DC power outputted from the battery, a stand-by inverter 22 for converting the DC voltage via the capacitor to the three-phase AC voltage with a variable voltage VV and a variable frequency VF, a transformer 18 for transforming the output voltage of the stand-by inverter 22 into a voltage of an appropriate level for the control unit 3A when the power is supplied from the AC voltage source, a filter 19 for filtering the power supplied from the stand-by inverter 22 to the transformer 18, a reactor 20 for smoothing the current supplied from the stand-by inverter 22 to the filter 19, a current ampere meter 21 for detecting the output current of the stand-by inverter 22, an AC voltage detector 25 for detecting the AC voltage supplied from an auxiliary power source to the transformer, a DC voltage detector 27 for detecting the DC voltage supplied to the stand-by inverter 22, a real current detector 28 for detecting the current supplied to the control unit 3A in the normal power supply condition, and an automatic rescue operation control unit 26A for performing its own automatic rescue operation by controlling the stand-by inverter 22 in accordance with output signals from various devices 21, 25 when the power failure occurs for detecting a real current supplied to the control unit 3A via the real current detector 28, and for receiving a voltage signal detected by a power source voltage detector 30 to calculate the imaginary current contained in the real current and then to provide the compensation current to compensate for the imaginary current supplied to the stand-by inverter 22, thereby acting as an active power compensation filter in the normal power supply condition.

Figure 4:
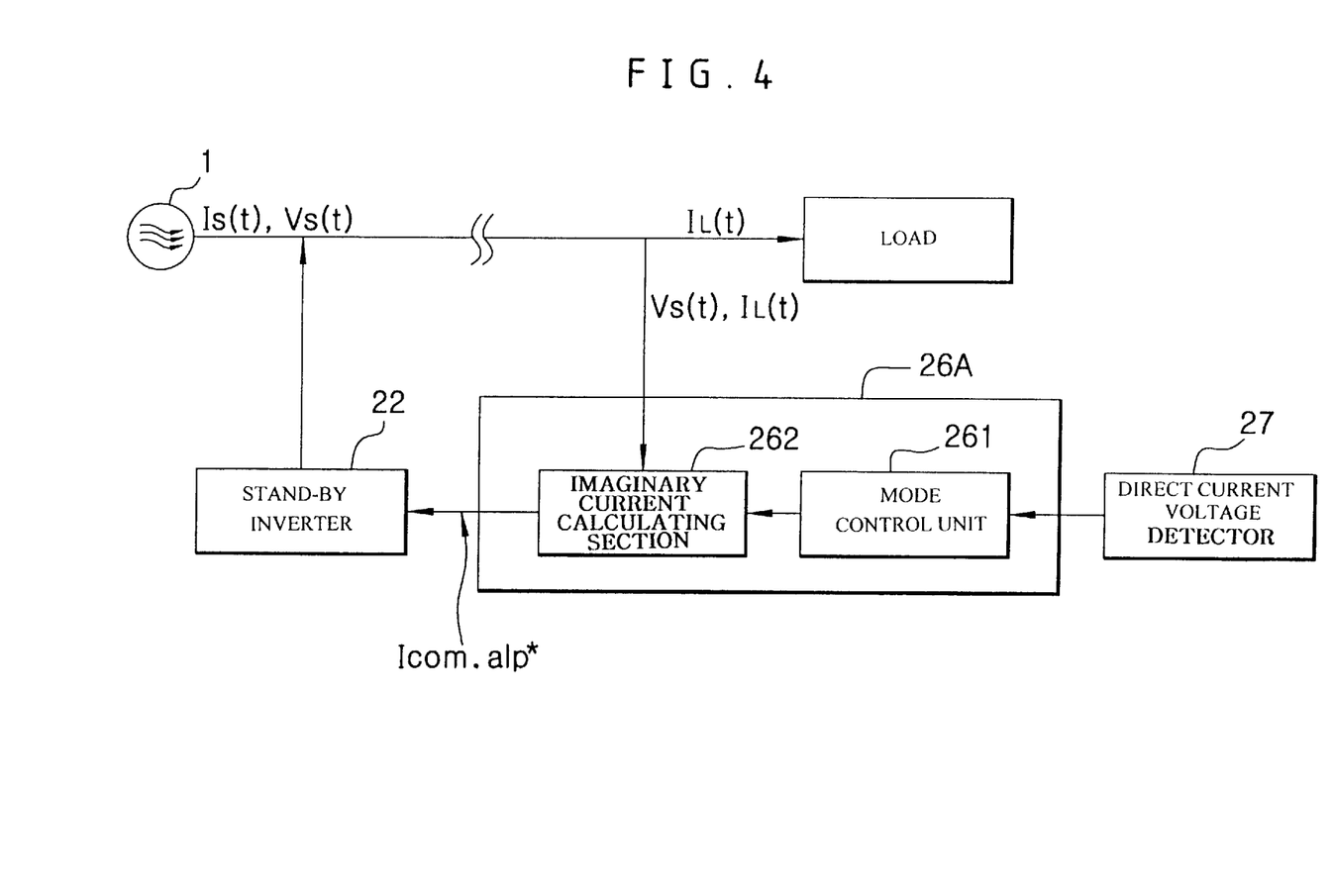
FIG. 4 is a block diagram of an active compensation filter of the ALP device in FIG. 3.

FIG. 4 is a block diagram of the active compensation filter of the ALP device in FIG. 3. Referring to FIG. 4, the active compensation filter preferably comprises a mode control unit 261 for selecting either an active filter mode in the normal power supply condition, or an ALP operation mode in the power failure condition after the automatic rescue operation control unit 26A determines whether or not the power failure occurs by detecting the output signal of the voltage detector 27, and an imaginary current calculating section 262 for calculating the effective current from the voltage Vs(t) outputted from the power source voltage detector 30, from the DC voltage Vdc outputted from the DC voltage detector 27, and from the load current $I_L$ (t) outputted from the load current detector 28 when the ALP device is operating in the active filter mode under the control of the mode control unit, and for calculating the compensation current $I_{com}^*$ by adding or subtracting a load current to or from the effective current so as to provide the compensation current control value (Icom. alp*) to the stand-by inverter 22. Here, in order to get the compensation current $I_{com}^*$ for compensating for the imaginary current, the imaginary current calculating section 262 calculates a value corresponding to the effective current from the load current $I_L(t)$ through the control unit 3A, adds the DC voltage obtained by the DC voltage detector 27 to the calculated value corresponding to the effective current to get a value corresponding to the total effective current, multiplies the Vs(t) detected by the power source voltage detector 30 by the calculated value corresponding to the total effective current, and then adds or subtracts the load current to or from the value obtained by multiplying Vs(t) by the total effective current. This is explained by a compensation theory of a general active filter.

Supposing that the voltage supplied to the load at the power supply stage of the circuit is sinusoidal for explaining the above described compensation theory of the active filter, the sinusoidal voltage can be expressed as V(t)=Vm×sin (ωt), and the instantaneous current passing through the nonlinear load such as, for example, a diode can be expressed as $$I(t) = Im\text{SIN}(\omega t + \phi_1) + \sum_{n=0}^{\infty} Im\text{SIN}(\omega t + \phi_n)$$

where the first term is a reference current component, and the second term corresponds to a harmonic wave current component. The instantaneous current as described above can be indicated in the Fourier series as I(t)=Im sin(ωt)+Imb cos(ωt)+Ih, where, the first term is a sinusoidal wave component, the second term is a cosine wave component, and the third term is a DC component.

Therefore, the instantaneous power can be expressed as

P=V(t) I(t)=½VmIma(I-cos2 ωt)+½VmImb sin2 ωt+VmIh sin ωt where, the first term is ½VmIma and is always positive, but the averages of the second and the third terms are always 0.

Therefore, the first term indicates an effective current component, and the second and the third terms correspond to instantaneous imaginary currents.

It can be also understood that the effective current component is Ia(t)=Imasin(ωt), and the imaginary current component is Irb(ωt)=ImbCOS(ωt)+Ih.

Figure 5:
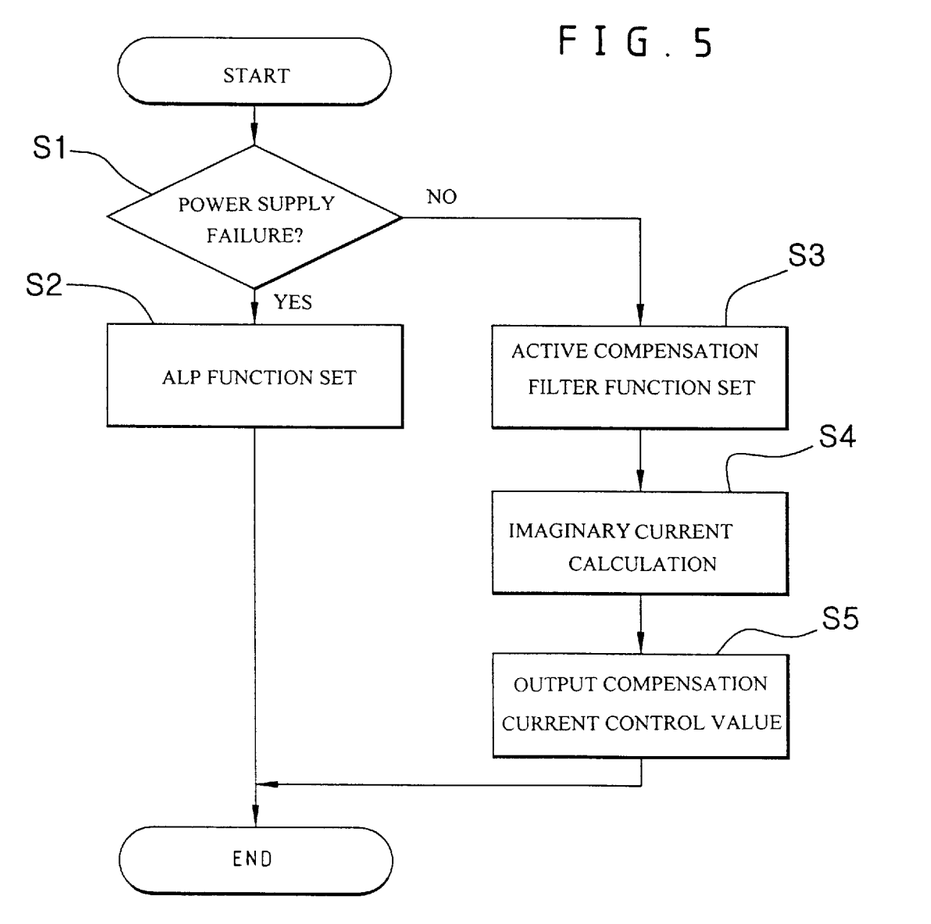
FIG. 5 is a flow diagram showing the principal operating steps of setting an operation mode of the apparatus according to the present invention.

Referring now to FIG. 5, the operation procedure of the ALP device 3B programmed in the automatic rescue operation control unit 26A according to the present invention will now be explained. If the normal power is not supplied, it is determined whether or not the power failure occurs by checking the output of the DC voltage detector 27, which is available by making the normally opened contacts (29) in a closed state, at Step S1. The ALP mode is selected at step S2 if it is determined that the power failure occurs. However, if it is determined that the power failure does not occur, the active compensation filter mode is selected in order to control the current passing the power input stage of the control unit at Step S3.

The imaginary current is thereafter calculated by detecting the load current outputted from the load current detector at Step S4. The stand-by inverter is eventually controlled at Step S5 after the imaginary current, and accordingly the compensation current is calculated.

Figure 6A:
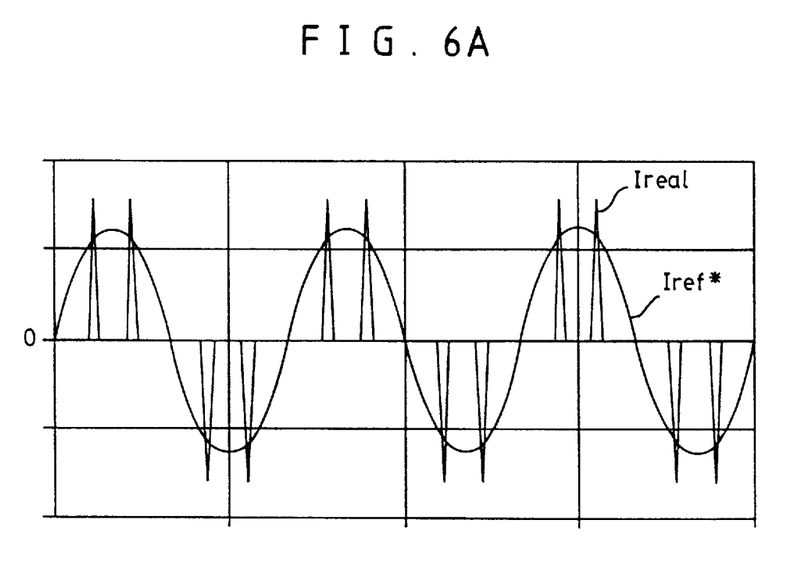
FIGS. 6A and 6B are graphs illustrating the waveforms of the real current, reference current ,and compensation current flowing through the control panel in FIG. 3.
Figure 6B:
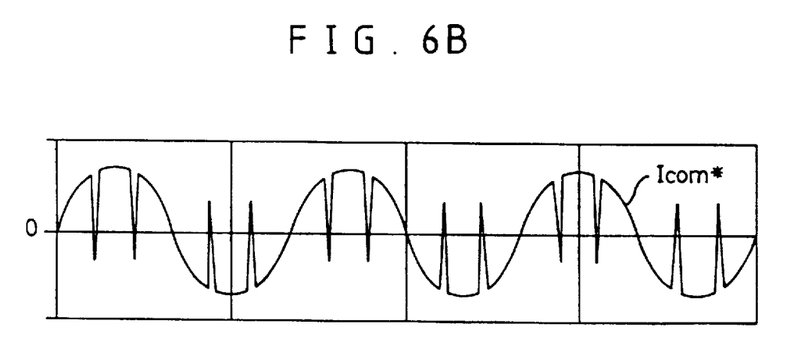

FIG. 6A shows the waveforms of the load current (the real current) supplied to the control unit 3A and of the reference current, i.e., the reference current which is preferably aimed to be supplied to the control unit 3A when the active compensation filter is neither provided nor operating in the system. FIG. 6B shows the waveform of the compensation current determined by both the real current and the reference current.

The operation of the apparatus configured as above will now be explained in accordance with FIGS. 3~6B. If the three-phase AC voltage source is failed to be supplied (when determined YES at step S1) as the result of checking the input of the three-phase AC voltage by the automatic rescue operation control unit 26A, the ALP mode is set at Step S2, and then an emergency rescue operation is performed in the same manner as in the related art. In another word, the main control unit 16 is operating normally under the control of the automatic rescue operation control unit 26A, and the main control unit 16 determines as to whether or not the system operation is stopped because of the power failure. If it is determined that the system is stopped because of the power failure, it is determined whether or not the elevator cage 12 is located within a door openable region. If it is determined that the cage location is within the door openable region, the door is opened so as to rescue passengers therein. If it is determined that the cage location is not within the door openable region, the system operates to move the elevator cage 12 to the nearest floor and then to open its door to rescue passengers. The inverter operates in the same manner as in the related art. However, if it is determined by the automatic rescue operation control unit 26A that the elevator cage is operating normally (when determined NO at step S1), the active compensation filter mode is set at Step S3, and the ALP device 3B performs the function of the active power filter at Steps S4 and S5. Referring now to FIG. 6A, 6B, the mode control unit 261 in the automatic rescue operation control unit 26A checks whether or not the power failure occurs in accordance with the output of the DC voltage detector 27, and then sets an operation mode that the active power compensation filtering is performed in the normal mode if it is checked that the power failure occurs.

The imaginary current calculating section 262 thereafter calculates the current corresponding to the effective current from the load current $I_L(t)$ passing through the control unit 3A, calculates the total effective current by adding the DC voltage Vdc outputted from the DC voltage detector 27 to the previously calculated value, multiplies the previously calculated total effective current by the phase of the power source voltage Vs(t) detected by the power source detector 30, and adds or subtracts the load current to or from the previously calculated value to obtain the compensation current Icom*. The imaginary current calculating section 262 thereafter obtains the compensation current control value Icom. alp* to be supplied to the stand-by inverter 22 for compensating for the imaginary current.

In another word, when the apparatus is operating in the active filter mode by the mode control unit 261, the imaginary current calculating section 262 detects the load current $I_L(t)$ outputted from the load current detector 28, enabling the detection of the real current Ireal shown in the FIG. 6A supplied to the control unit 3A, and then calculates the reference current Iref* as shown as a sinusoidal wave in FIG. 6A which is desirable at the load upon receipt of both the power source voltage Vs(t) from the power source voltage detector 30 and the DC voltage Vdc from the DC voltage detector 27. Finally, the compensation current Icom* can be obtained by comparing the two currents as shown in the FIG. 6B and can be expressed as $$Icom^* = Ireal - Iref^* \qquad \text{(equation 3)}$$

The compensation current control value Icom.alp* which should be supplied to the stand-by inverter is calculated by multiplying the compensation current by a predetermined factor ( a constant determined by the voltage controller of the active compensation filter: Kvdc.trans), and is expressed as $$Icom.alp^* = Icom^* \times Kvdc.trans \qquad \text{(equation 4)}$$

(where, Kvdc.trans is determined by the transformer and the DC voltage)

The calculated compensation current control value is supplied to the stand-by inverter 22. The stand-by inverter 22 of the ALP device 3B is then activated upon receipt of the supplied compensation current Icom.alp* calculated according to the equation 4, and at the same time, the automatic rescue operation control unit 26A activates the stand-by inverter so that the current passing through the reactor via the current ampere meter 21 is equal to the compensation current Icom.alp*.

According to the apparatus of the present invention, the compensation current is obtained in accordance with the DC voltage from the battery and the current supplied to the control unit by the automatic rescue operation control unit, and is supplied to the power input stage of the control unit, thereby enabling the system to provide the sinusoidal current from which the harmonic frequency components are removed and thus improving the total efficiency of the system, resulting in that the volume of the power input stage and the power consumption is greatly reduced. Further, the present invention has the advantage that it can provide above-described extra functions without increasing the cost or the volume of the system and without using a separate device, but using the already existing ALP device provided for the emergency operation.

What is claimed is:

1. An apparatus for controlling a rescue operation and for improving a power efficiency, having a control unit for controlling an operation of an elevator by activating an induction motor with a three-phase AC voltage source, and an ALP (Auto Landing of Power failure) device for controlling an emergency mode by supplying the three-phase AC voltage converted from a DC voltage from a battery by means of a stand-by inverter when a power failure occurs, the apparatus comprising:

opening/closing contacts being opened (OFF) in a normal power supply condition so as to make the ALP device not connected to the control unit and being closed (ON) in a power failure condition so as to make the ALP device connected to the control unit for supplying the power;

a DC voltage detector for detecting the DC voltage supplied to the stand-by inverter;

a load current detector for detecting the current supplied to the control unit in the normal power supply condition;

a power source voltage detector for detecting a voltage of the power source supplied to the control unit; and an automatic rescue operation controller for controlling the ALP device to perform an automatic rescue operation in the power failure condition determined in accordance with output signals of the DC voltage detector, and for acting as an active power compensation filter in the normal power supply condition determined in accordance with output signals of the load current detector, the DC voltage detector, and the power source voltage detector.

2. The apparatus as defined in claim 1, wherein the automatic rescue operation controller comprises:

a mode control unit for setting an operation mode of the ALP device either with an ALP operation mode in the power failure condition or with an active filter mode in the normal power supply condition after either the power failure condition or the normal power supply condition is determined in accordance with the output signal of the DC voltage detector; and an imaginary current calculating section for calculating an effective current upon receipt of a load current from the load current detector, a DC voltage from the DC voltage detector, and a power source voltage from the power source voltage detector, and for calculating a compensation current by adding or subtracting the load current to or from the effective current so as to provide a compensation current control value to the stand-by inverter.

3. The control apparatus as defined in claim 2, wherein the imaginary current calculating section calculates the effective current from the load current passing through the control unit, adds the DC value to the effective current so as to get a total effective current, multiplies the total effective current by the power source voltage detected by the voltage detector, and then adds or subtracts the load current to or from a multiplied value so as to get the compensation current for compensating for the imaginary current.

* * * * *